Patented Mar. 10, 1936

2,033,280

UNITED STATES PATENT OFFICE 2,033,280

SYNTHETIC RESIN VARNISH COMPOSITIONS

Charles L. Gabriel, Lawrence, N. Y., assignor, by mesne assignments, to Resinox Corporation, New York, N. Y., a corporation of Delaware No Drawing. Application May 11, 1931,
Serial No. 536,689

4 Claims. (Cl. 134—26)

The present invention relates to improvements in synthetic resin compositions. More particularly, it relates to resinous compositions of improved properties which are especially valuable in varnishes.

Attempts have been made in the past to prepare varnishes from synthetic resins such as phenol-aldehyde or phenol-methylene type by incorporating such resins in suitable solvents so that the resin could be satisfactorily applied in a thin smooth film to the surface to be coated. For many purposes, however, varnishes thus produced have been highly unsatisfactory. This has been particularly the case where the varnish was employed for coating surfaces subject to some degree of bending or distortion and also where it was necessary to cut or punch holes through the coated article. In such cases the ordinary films have been subject to cracking, checking and other similar defects, rendering the coated surface unsightly and the article otherwise generally unsuited for the purposes for which it was designed.

It has now been discovered that by incorporating in such varnishes compounds of the general type resulting from the esterification of polybasic acids partly with a polyhydric alcohol, such as glycerol and partly with a monohydric alcohol, the difficulties just enumerated are entirely overcome. In addition, these compounds serve other useful purposes which will become evident later.

Esters of the type contemplated are represented by the formulae:

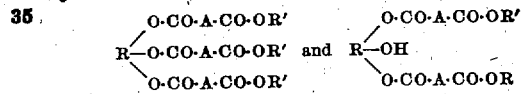

where A represents the radicle of a polybasic acid, R the radicle of a polyhydric alcohol (glycerol) and R' the radicle of a monohydric alcohol. It may be seen from the above formulas that the esters contemplated for use in the present invention are those in which the carboxyl groups are substantially completely esterified.

Compounds of this type may be synthesized in a number of ways. For example, a polybasic acid may be mixed with proportionate quantities of glycerol and a monohydric alcohol, and the resulting mixture heated in the presence of an esterification catalyst. Preferably, the glycerol is first reacted with the polybasic acid and the product thus obtained reacted with a monohydric alcohol in the presence of an esterification catalyst. Still other methods may, of course, be employed, if desired.

The following specific example will illustrate a method by which these compounds may usually be satisfactorily produced: One mol of glycerol and two mols of phthalic anhydride are heated together for 10-30 minutes at a temperature of 150-200° C. To the resulting compound is then added an excess of normal butyl alcohol mixed with 5-10 grams of sulfuric acid. This mixture is then heated to bring about esterification. The product obtained, namely butyl glyceryl phthalate, is a heavy viscous liquid with a molecular weight of approximately 500.

Other similar compounds which may be obtained by slight modification of the procedure just set forth are glyceryl propyl phthalate, glyceryl benzyl phthalate, and similar esters of other polybasic acids such as terephthalic acid, tartaric acid, citric acid and the like. Other monohydric alcohols may also, of course, be substituted for those just cited as examples. Compounds of the type contemplated, therefore, may be designated as esters resulting from the reaction of polybasic acids partly with a polyhydric alcohol such as glycerol, and partly with a monohydric alcohol, one or all of the hydroxyl radicles of the glycerol being combined with carboxyl groups of the acid and more than one molecule of the acid may be present in the ester. Examples of other suitable polyhydric alcohols are: erythritol, arabitol, dulcitol, etc. (the term "polyhydric alcohol" used in the specification and in the appended claims is employed as meaning an alcohol containing three or more hydroxyl groups).

Esters of the type set forth above are viscous non-volatile liquids of high molecular weight, and as previously indicated, particularly well suited for use with synthetic resins such as phenol-aldehyde, urea-formaldehyde, etc. in the preparation of punch stock molded products, varnishes, etc. The esters in question are compatible with the resins and soluble in the usual solvents, such as alcohol, acetone, benzol, etc., used in the production of resinous varnishes. In preparing a varnish generally 20-40 parts of an ester of the type described as for example, glyceryl butyl phthalate, to 100 parts by weight of a resin of the heat-hardening type such as phenol-formaldehyde resin, may be incorporated in a suitable solvent or solvent mixture of the usual type, as for example, methyl or ethyl alcohols, acetone, methyl ethyl ketone, ethyl acetate, benzol, etc. Generally, about 20 parts by weight of solvent to 80 parts by weight of ester-resin mixture will give a satisfactory resin of suitable consistency. It is, of course, possible to vary considerably the proportions set forth above without lessening the scope of the present invention.

Varnishes of the type hereinabove disclosed may be applied by the usual means directly to wood, metal, cloth, etc., and are particularly well suited to the production of laminated sheets and similar articles, the sheets thereby obtained being flexible and at the same time tough and resistant to deformation except where excessive quantities of the ester have been employed.

After applying the varnish, the coated material is allowed to dry at ordinary drying temperatures, say approximately 80° C., until the solvents and any moisture present have been evaporated. This temperature and the time of drying may, of course, be varied considerably depending upon the general operating conditions and the character of product desired. The temperature is next preferably raised for a time to 125–175° C. so as to convert the resin into the infusible and unreactive form. It is customary also in the case of laminated and molded products to subject the article being heated to pressures in the neighborhood of 2000 pounds per square inch. This, however, may also be varied considerably depending upon the particular conditions under which it is desired to work and the article to be produced.

If desired, the mixed esters hereinabove referred to, may be incorporated with the resin without the aid of solvents. The product thus obtained may be subjected to heat and pressure as previously indicated to form molded products and the like.

What is claimed is:

1. A coating composition consisting essentially of a heat hardening synthetic resin, a liquid reaction product resulting from the complete esterification of phthalic acid partly with glycerol and partly with butyl alcohol, and a volatile solvent for said resin and reaction product, in such proportions as to produce a liquid of varnish consistency and capable of forming a homogeneous, flexible and tough film.

2. A coating composition consisting essentially of 100 parts of a heat hardening synthetic resin, 20 to 40 parts of a liquid reaction product resulting from the complete esterification of phthalic acid partly with glycerol and partly with butyl alcohol, and a volatile solvent for said resin and reaction product in such proportion as to produce a liquid of varnish consistency.

3. A coating composition consisting essentially of a heat hardening synthetic resin, a liquid reaction product resulting from the esterification of a polybasic aromatic acid chosen from the group consisting of phthalic acid and terephthalic acid partly with a polyhydric alcohol chosen from the group consisting of glycerol, erythritol, arabitol, and dulcitol, and partly with a monohydric alcohol chosen from the group consisting of butyl alcohol, propyl alcohol, and benzyl alcohol, the carboxyl group of said polybasic acid being substantially completely esterified, and a volatile solvent for said resin and reaction product, in such proportions as to produce a liquid of varnish consistency and capable of forming a homogeneous, flexible and tough film.

4. A coating composition consisting essentially of 100 parts of a heat hardening synthetic resin, 20 to 40 parts of a liquid reaction product resulting from the esterification of a polybasic aromatic acid chosen from the group consisting of phthalic acid and terephthalic acid partly with a polyhydric alcohol chosen from the group consisting of glycerol, erythritol, arabitol, and dulcitol, and partly with a monohydric alcohol chosen from the group consisting of butyl alcohol, propyl alcohol, and benzyl alcohol, the carboxyl group of said polybasic acid being substantially completely esterified, and a volatile solvent for said resin and reaction product in such proportion as to produce a liquid of varnish consistency.

CHARLES L. GABRIEL.

Certificate of Correction

Patent No. 2,033,280. March 10, 1936.

CHARLES L. GABRIEL

It is hereby certified that error appears in the printed specification of the above numbered patent requiring correction as follows: Page 1, first column, line 38, in the last line of the formula, right hand side, for "OR" read *OR'*; and that the said Letters Patent should be read with this correction therein that the same may conform to the record of the case in the Patent Office.

Signed and sealed this 5th day of May, A. D. 1936.

[SEAL]

LESLIE FRAZER,
*Acting Commissioner of Patents.* weight of solvent to 80 parts by weight of ester-resin mixture will give a satisfactory resin of suitable consistency. It is, of course, possible to vary considerably the proportions set forth above without lessening the scope of the present invention.

Varnishes of the type hereinabove disclosed may be applied by the usual means directly to wood, metal, cloth, etc., and are particularly well suited to the production of laminated sheets and similar articles, the sheets thereby obtained being flexible and at the same time tough and resistant to deformation except where excessive quantities of the ester have been employed.

After applying the varnish, the coated material is allowed to dry at ordinary drying temperatures, say approximately 80° C., until the solvents and any moisture present have been evaporated. This temperature and the time of drying may, of course, be varied considerably depending upon the general operating conditions and the character of product desired. The temperature is next preferably raised for a time to 125–175° C. so as to convert the resin into the infusible and unreactive form. It is customary also in the case of laminated and molded products to subject the article being heated to pressures in the neighborhood of 2000 pounds per square inch. This, however, may also be varied considerably depending upon the particular conditions under which it is desired to work and the article to be produced.

If desired, the mixed esters hereinabove referred to, may be incorporated with the resin without the aid of solvents. The product thus obtained may be subjected to heat and pressure as previously indicated to form molded products and the like.

What is claimed is:

1. A coating composition consisting essentially of a heat hardening synthetic resin, a liquid reaction product resulting from the complete esterification of phthalic acid partly with glycerol and partly with butyl alcohol, and a volatile solvent for said resin and reaction product, in such proportions as to produce a liquid of varnish consistency and capable of forming a homogeneous, flexible and tough film.

2. A coating composition consisting essentially of 100 parts of a heat hardening synthetic resin, 20 to 40 parts of a liquid reaction product resulting from the complete esterification of phthalic acid partly with glycerol and partly with butyl alcohol, and a volatile solvent for said resin and reaction product in such proportion as to produce a liquid of varnish consistency.

3. A coating composition consisting essentially of a heat hardening synthetic resin, a liquid reaction product resulting from the esterification of a polybasic aromatic acid chosen from the group consisting of phthalic acid and terephthalic acid partly with a polyhydric alcohol chosen from the group consisting of glycerol, erythritol, arabitol, and dulcitol, and partly with a monohydric alcohol chosen from the group consisting of butyl alcohol, propyl alcohol, and benzyl alcohol, the carboxyl group of said polybasic acid being substantially completely esterified, and a volatile solvent for said resin and reaction product, in such proportions as to produce a liquid of varnish consistency and capable of forming a homogeneous, flexible and tough film.

4. A coating composition consisting essentially of 100 parts of a heat hardening synthetic resin, 20 to 40 parts of a liquid reaction product resulting from the esterification of a polybasic aromatic acid chosen from the group consisting of phthalic acid and terephthalic acid partly with a polyhydric alcohol chosen from the group consisting of glycerol, erythritol, arabitol, and dulcitol, and partly with a monohydric alcohol chosen from the group consisting of butyl alcohol, propyl alcohol, and benzyl alcohol, the carboxyl group of said polybasic acid being substantially completely esterified, and a volatile solvent for said resin and reaction product in such proportion as to produce a liquid of varnish consistency.

CHARLES L. GABRIEL.

Certificate of Correction

Patent No. 2,033,280.  March 10, 1936.

CHARLES L. GABRIEL

It is hereby certified that error appears in the printed specification of the above numbered patent requiring correction as follows: Page 1, first column, line 38, in the last line of the formula, right hand side, for "OR" read OR'; and that the said Letters Patent should be read with this correction therein that the same may conform to the record of the case in the Patent Office.

Signed and sealed this 5th day of May, A. D. 1936.

[SEAL]

LESLIE FRAZER,
*Acting Commissioner of Patents.*